US009042235B1

(12) United States Patent
Kemmerer, Jr. et al.

(10) Patent No.: US 9,042,235 B1
(45) Date of Patent: May 26, 2015

(54) DETERMINING PEER-TO-PEER COMMUNICATION PATHS BETWEEN SERVICE PROVIDERS

(71) Applicant: GENBAND US LLC, Frisco, TX (US)

(72) Inventors: Frederick C. Kemmerer, Jr., Hollis, NH (US); Carroll L. Gray-Preston, Morrisville, NC (US); Jeremy Fuller, Linlithgow (GB)

(73) Assignee: GENBAND US LLC, Frisco, TX (US)

( * ) Notice: Subject to any disclaimer, the term of this patent is extended or adjusted under 35 U.S.C. 154(b) by 137 days.

(21) Appl. No.: 13/841,185

(22) Filed: Mar. 15, 2013

(51) Int. Cl.
 *H04L 12/717* (2013.01)
 *H04W 40/20* (2009.01)

(52) U.S. Cl.
 CPC ............ *H04L 45/42* (2013.01); *H04W 40/20* (2013.01)

(58) Field of Classification Search
 CPC .......... H04L 45/04; H04L 45/12; H04L 45/44
 USPC ................................................. 370/351, 238
 See application file for complete search history.

(56) References Cited

U.S. PATENT DOCUMENTS

| 2006/0067317 | A1* | 3/2006 | Engstrand et al. ............ 370/389 |
| 2006/0126642 | A1* | 6/2006 | Kojima et al. ............ 370/395.52 |
| 2008/0005056 | A1* | 1/2008 | Stelzig ............................ 707/1 |
| 2008/0165946 | A1* | 7/2008 | Whiting et al. .......... 379/221.01 |
| 2009/0141730 | A1* | 6/2009 | Long .............................. 370/411 |
| 2010/0036947 | A1* | 2/2010 | Krishnamurthy ............. 709/225 |
| 2010/0074268 | A1* | 3/2010 | Raza .............................. 370/401 |
| 2010/0115083 | A1* | 5/2010 | Oba et al. ...................... 709/224 |
| 2011/0032833 | A1  | 2/2011 | Zhang et al. |
| 2012/0128003 | A1* | 5/2012 | Kim et al. ................... 370/395.5 |
| 2014/0160981 | A1* | 6/2014 | Kompella ...................... 370/254 |

OTHER PUBLICATIONS

European Patent Office, "European Search Report," for EPO Application No. 14159601.5, Jun. 16, 2014.
Imielinski et all, "GPS-Based Addressing and Routing," RFC 2009, Nov. 1996 (XP-002131778), pp. 1-28.

* cited by examiner

*Primary Examiner* — Gary Mui
(74) *Attorney, Agent, or Firm* — Fogarty, L.L.C.

(57) ABSTRACT

Systems and methods for determining peer to peer communication paths between service providers are presented. In one embodiment the method is carried out in a peer-to-peer interconnect controller. The method may include obtaining default route information associated with a subscriber on a foreign service provider network in response to a request for route information, the default route information comprising identification of a peer access point designated for peer-to-peer interconnection. The method may also include generating a directed query for additional peer-to-peer interconnection routes in response to the default route information. Additionally, the method may include obtaining one or more candidate routes from the foreign service provider network in response to the directed query. In one embodiment, the method may also include selecting one of the candidate routes for establishing a peer-to-peer connection with the subscriber of the foreign service provider network.

15 Claims, 7 Drawing Sheets

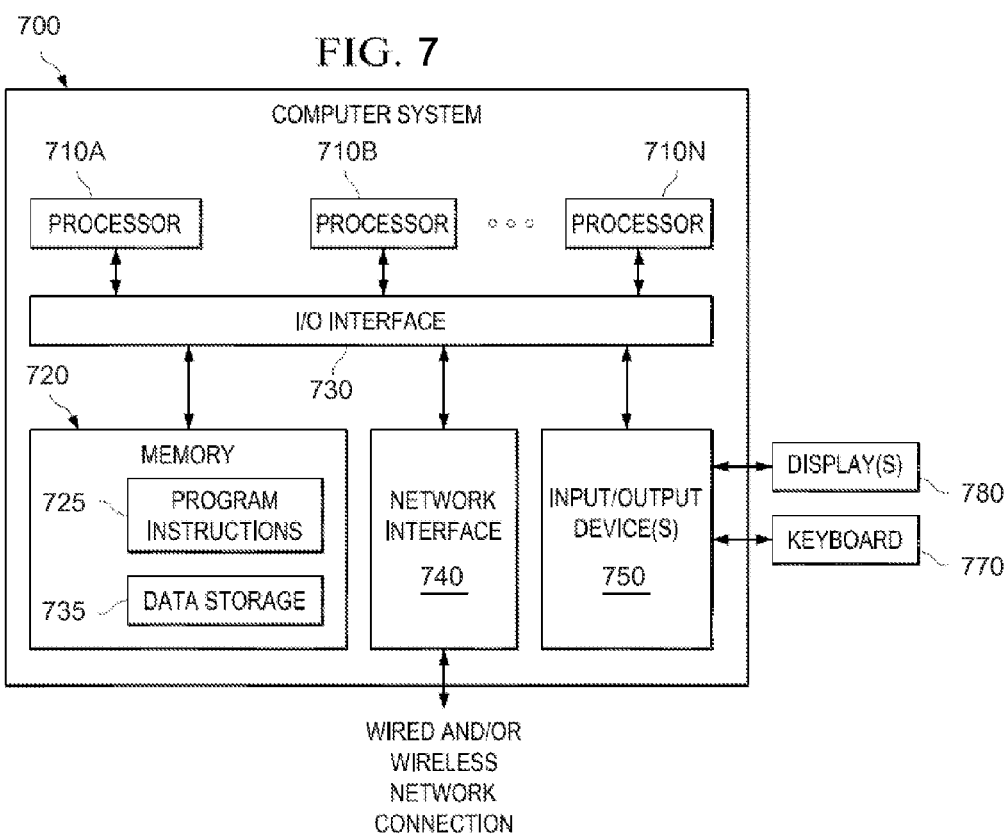

DETERMINING PEER-TO-PEER COMMUNICATION PATHS BETWEEN SERVICE PROVIDERS

CROSS-REFERENCE TO RELATED APPLICATIONS

This application is related to U.S. patent application Ser. No. 13/838,769 entitled "Methods and Systems for Peer-to-Peer Interconnection Between Service Providers," filed on Mar. 15, 2013, and Ser. No. 13/840,072 entitled "Methods and Systems for Direct Routing of Communication Sessions for Mobile IP Communication End Points," filed on Mar. 15, 2013, each of which are incorporated herein by reference in their entirety.

TECHNICAL FIELD

This disclosure relates generally to telecommunications, and more specifically, to methods and systems for determining peer-to-peer communication paths between service providers.

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

The telecommunications market includes many different service providers, each typically offering compatible communications services. Compatibility is often required so that customers of one service provider can communicate with friends, family, or other end users who may be customers of another service provider. Although service providers typically offer services that are compatible with other service provider networks, there has not conventionally been a direct connect option between users of diverse service provider networks.

One prior solution for handling interfaces between different service provider networks is conventionally handled by a third party intermediary. The third party intermediary would typically establish an interconnect agreement with many different service providers, and then provide connection services between users of the different service provider networks.

In certain situations, a communication will hop between multiple third parties or across multiple carriers in order to find an agreed path between communication endpoints. In legacy systems, a call may be routed through several carriers before connecting between the end users. Each connection may include connection and/or termination fees. These prior systems become very complex and expensive.

Today, packet routing paths for sessions are typically determined via centralized $3^{rd}$ party routing entities or pre-agreed upon between service providers. This approach leads to lack of flexibility to update available routes, change costs in real time, and allow the use of new connectivity paths to exploit existing routable points provided by service providers.

SUMMARY

Systems and methods for determining peer to peer communication paths between service providers are presented. In one embodiment the method is carried out in a peer-to-peer interconnect controller. The method may include obtaining default route information associated with a subscriber on a foreign service provider network in response to a request for route information, the default route information comprising identification of a peer access point designated for peer-to-peer interconnection. The method may also include generating a directed query for additional peer-to-peer interconnection routes in response to the default route information. Additionally, the method may include obtaining one or more candidate routes from the foreign service provider network in response to the directed query. In one embodiment, the method may also include selecting one of the candidate routes for establishing a peer-to-peer connection with the subscriber of the foreign service provider network.

BRIEF DESCRIPTION OF THE DRAWINGS

Reference will now be made to the accompanying drawings, wherein:

FIG. 7 is a block diagram of a computer system configured to implement various systems and methods described herein according to some embodiments.

DETAILED DESCRIPTION

Embodiments disclosed herein are directed generally to methods and systems for determining peer-to-peer communication paths between service providers. According to certain embodiments, a method and its associated data schema enable service providers to establish route and path information which they exclusively control and then cooperatively determine an efficient optimal route to convey multimedia traffic between them. In certain embodiments a system and database structure enable peering service providers to determine an efficient and optimal communications route to convey session signaling, and optionally, media between themselves to complete a multimedia communications session.

Beneficially, certain embodiments eliminate the need for centralized sources and associated expenses of available routes and paths. Additionally, certain embodiments provide greater flexibility for service providers to add routes and paths in near real-time and allow them to be used to route traffic as soon as they are established. Certain embodiments also provide for automation of the determination of complete, usable routes between service providers based upon information associated with the service providers involved which they can individually update in near real-time. Additional benefits that may be recognized through certain embodiments described herein include the ability for service providers to change the cost of using an available route in real-time based upon any criteria (example traffic, capacity, billing strategies, etc.) and have such changes appropriately applied in an optimized routing decision.

Certain embodiments employ database technology to solve the difficult problem of combining knowledge of available peering points with a service provider's options for connectivity to reach them to determine a complete and usable set of available routes to complete a multimedia session.

Aspects of the example embodiments described herein may be implemented using general purpose databases and query languages such as SQL, XML, and HTML. Such embodiments may enable Over The Top (OTT) communication providers, who typically do not deal in telecommunication protocols, to make use of the embodiments. For example, multimedia providers, such as providers of chat, video chat, OTT telephone services, OTT fax services, and the like may make use of the certain embodiments described herein.

The term "telecommunications," as used herein, is intended to encompass voice communications or telephony, as well as other forms of communications (e.g., video communications, videoconferencing, instant messaging or IM, Short Messaging Service or SMS, emails, machine-to-machine and other non-human to non-human communications, etc.) that may take place electronically, for example, over wireless networks, circuit-switched networks, packet-switched networks, or any combination thereof.

Figure 1:
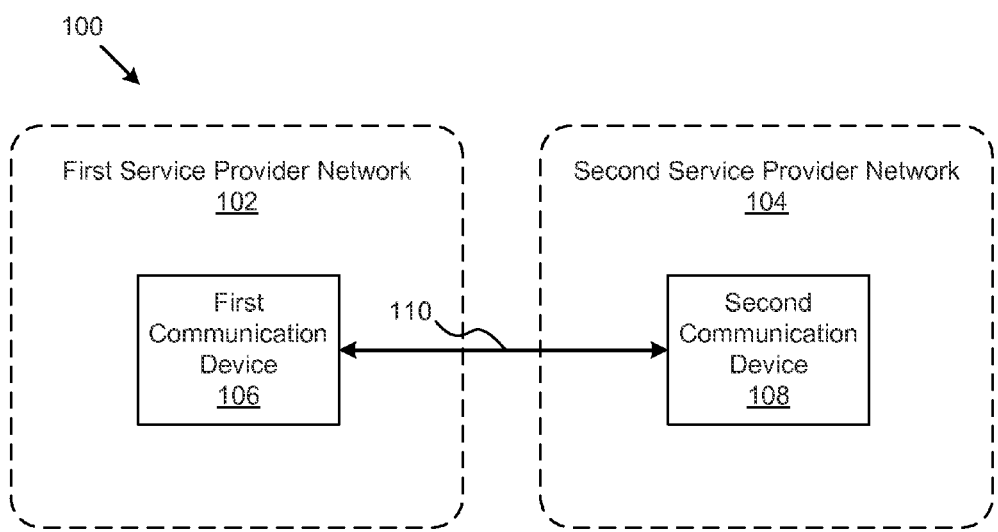
FIG. 1 is a block diagram illustrating one embodiment of a system for determining peer-to-peer communication paths between service providers.

FIG. 1 is a block diagram illustrating one embodiment of a system for peer-to-peer interconnection between service providers. In one embodiment, the system 100 includes a first service provider network 102 and a second service provider network 104. Examples of service providers include, but are not limited to, AT&T®, Verizon®, Vodafone™, etc. In one embodiment, the provider networks 102 may be the networks may be packet-switched, circuit-switched, wireless, or any combination thereof. In general embodiments, a first communication device 106 on the first service provider network 102 may be configured to communicate with a second communication device 108 on a second service provider network 104 over a peer-to-peer communication interconnection path 110 between the first service provider network 102 and the second service provider network 104. In one embodiment, first communication device 106 and second communication device 108 are user communication devices (e.g., telephones, mobile phones, laptops, tablet computers, machines and other devices which may interact automatically or without human control, etc.) for a user who is a subscriber of the first service provider network 102 and second service provider network 104 respectively. As used herein, the term "foreign service provider" means a different service provider network than one that a user subscribes to (e.g., second service provider network 104 as to first communication device 106 in FIGS. 1-2).

Beneficially, such an embodiment may enable the first communication device 106 to initiate, negotiate, and carry out communications with the second communication device 108 without requiring a central route lookup function or an administrator. More specifically, the present embodiments may eliminate use of centralized or third-party interconnection sources, and the associated expenses of routing and relating number lookup information. Thus, use of such centralized or third-party interconnection sources by the service providers 102,104 is not required for enabling communication between devices 106,108. Further benefits may include elimination of class 4 interconnection elements in existing network infrastructures.

Figure 2:
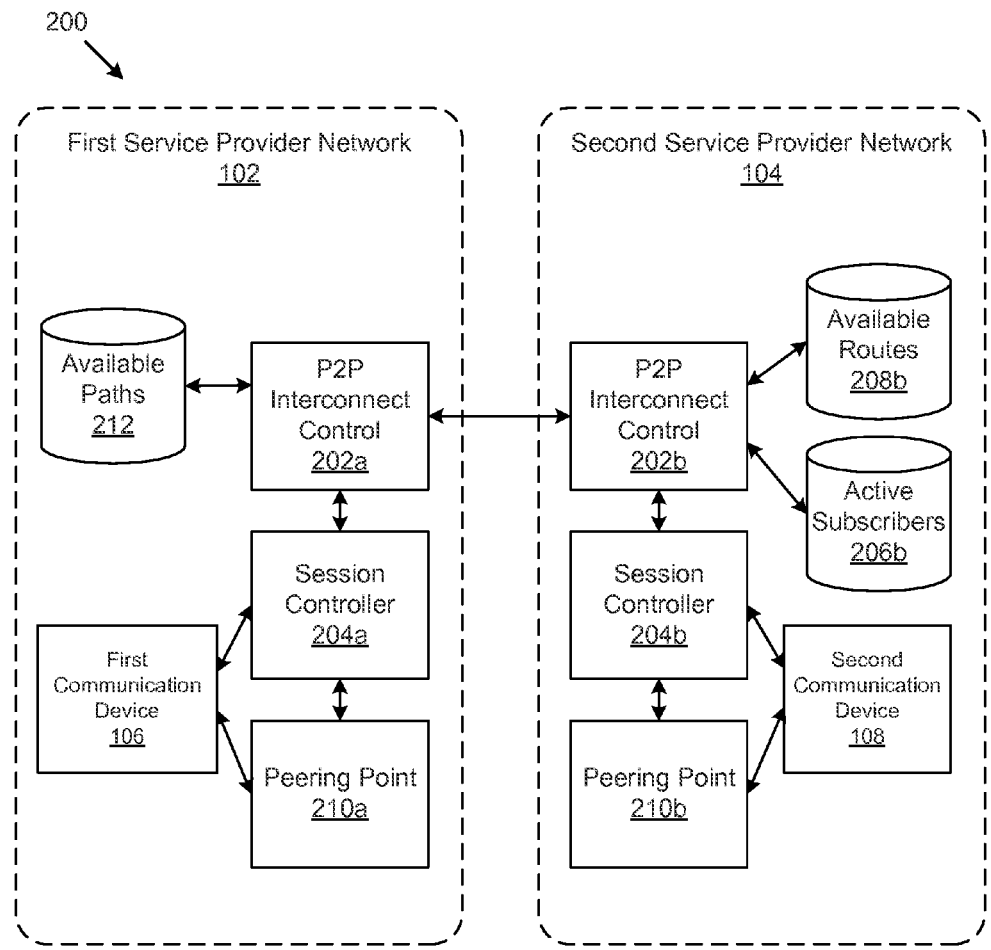
FIG. 2 is a block diagram illustrating another embodiment of a system for determining peer-to-peer communication paths between service providers.

FIG. 2 is a block diagram illustrating another embodiment of a system 200 for peer-to-peer interconnection between service providers. As in FIG. 1, system 200 may also include a first service provider network 102 and a second service provider network 104, each providing user connectivity to a first communication device 106 and second communication device 108 respectively. In addition, the system 200 may include a peer-to-peer interconnect control 202a-b, and a session controller 204a-b.

Figure 4:
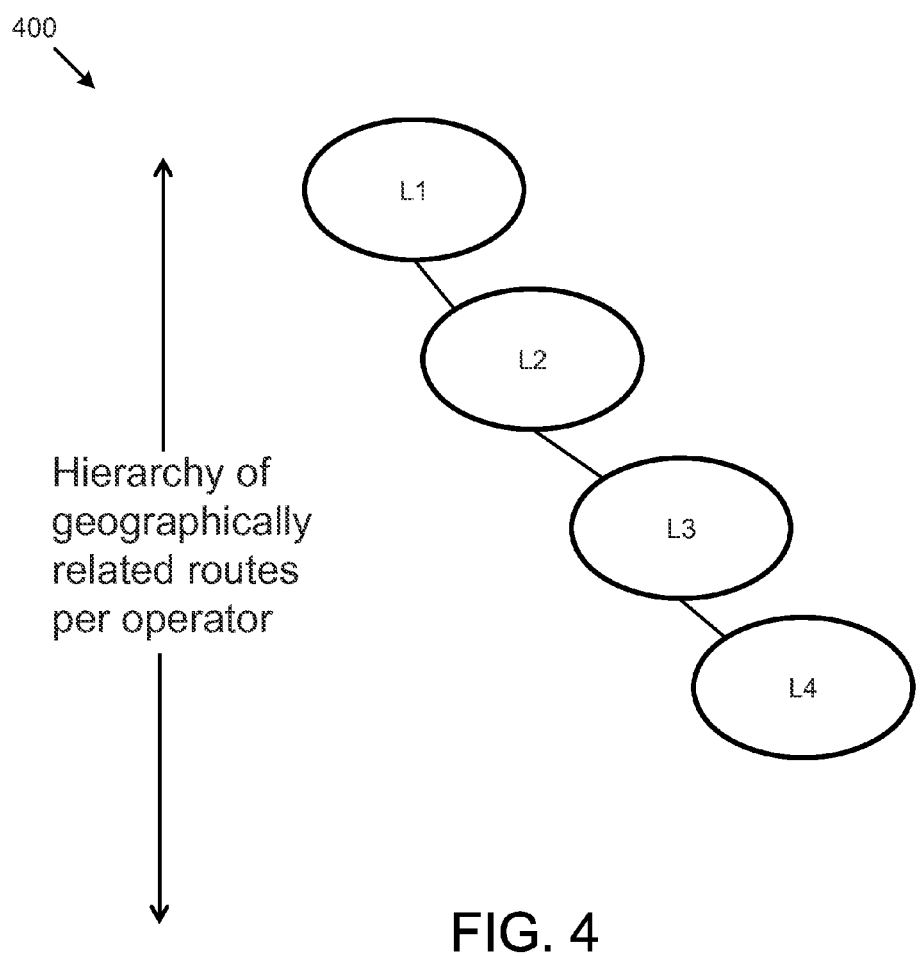
FIG. 4 is a database schema diagram illustrating a hierarchical routing database schema.

Peer-to-peer interconnect control 202 may be configured to access and query active subscribers database 206 and available routes database 208. In one embodiment, each of the first service provider network 102 and the second service provider network 104 each maintain an active subscribers database 206a,b (206a not shown) and an available routes database 208a,b (208a not shown) respectively for storing connectivity information for the local network. Additionally, first service provider network 102 includes available paths database 212. Available paths database 212 stores a list of paths that the originating service providers (e.g., first service provider) has available to connect to various locations. The records in available paths database 212 represent paths that the originating service provider has available to carry a call to various points in the world. The information in available paths database 212 is accessed via the same hierarchical key structure as shown in FIG. 4 so that it may be joined with the queries of the second carrier's available routes database in order to create complete routes that may be used to complete a multimedia session.

For example, an identifier associated with first communication device 106 may be stored in active subscribers database 206a, which is maintained by first service provider network 102. Similarly, available routes database 208a may store a listing of available connection routes for accessing first communication device 106. Likewise, the active subscribers database 206b and available routes database 208b maintained by second service provider network 104 may include information for connecting to second communication device 108.

Peer-to-Peer interconnect control 202a may handle coordination of peer-to-peer communication routing for all devices on first service provider network 102. In one embodiment, peer-to-peer interconnect control 202a may be a communication interface to second service provider network 104 and other service provider networks. Session controller 204a may be in communication with peer-to-peer control 202a, and may serve as an internal interface to first communication device 106. Peering point 210a may handle device-to-device communication between the first communication device 106 and the second communication device 108 once the peer-to-peer link has been negotiated and routed by peer-to-peer interconnect control 202a.

Thus, in a simplified view, the peer-to-peer interconnect control 202a negotiates and routes peer-to-peer communication links between service provider networks, session controller 204a handles intra-network interfaces between devices, and peering point 210a handles content communication between service provider networks once the link has been established by peer-to-peer interconnect control 202a. One of ordinary skill in the art will recognize that each of the corresponding devices in the second service provider network have a similar and corresponding function.

Figure 3:
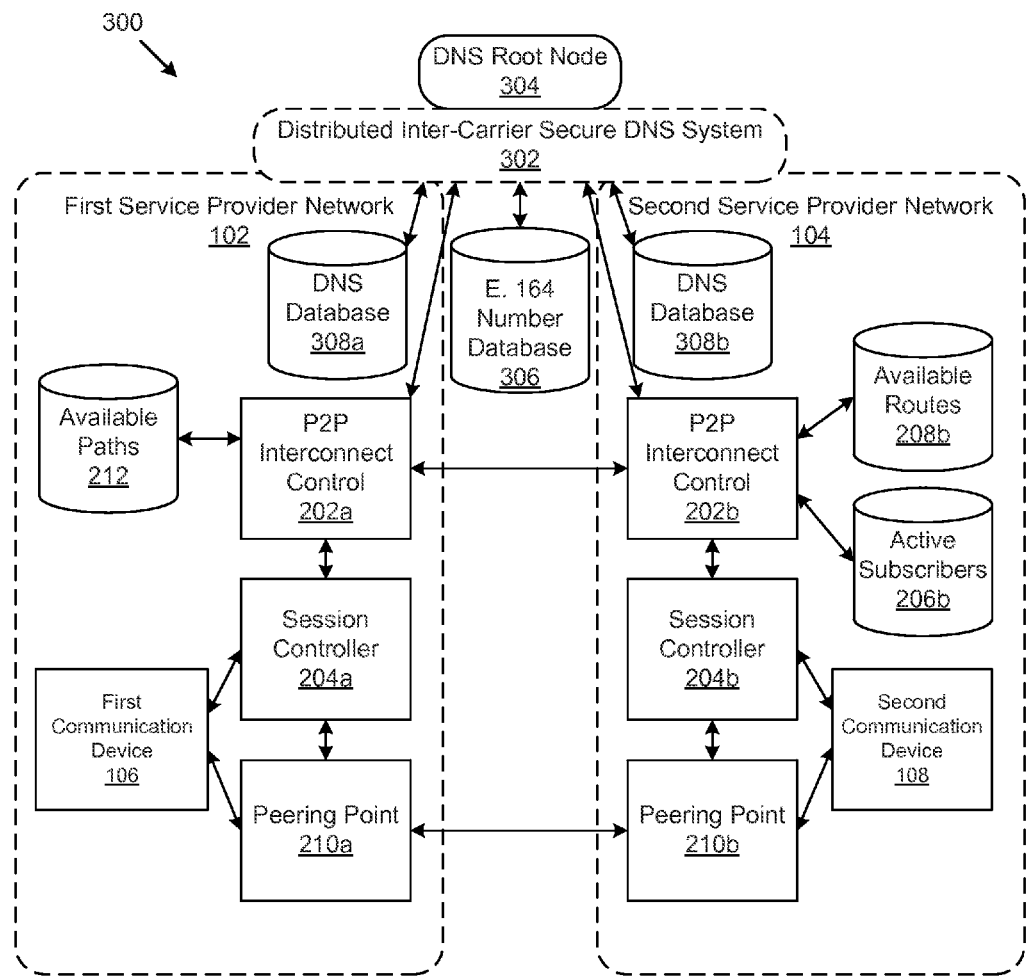
FIG. 3 is a block diagram illustrating another embodiment of a system for determining peer-to-peer communication paths between service providers.

FIG. 3 is a block diagram illustrating another embodiment of a system 300 for peer-to-peer interconnection between service providers 102-104. The embodiment of FIG. 3 illustrates additional components which may facilitate peer-to-peer interconnection between service provider networks. In addition to the components described in FIGS. 1-2, the embodiment of FIG. 3 includes a Distributed Inter-Carrier Secure DNS System (DICSDS) 302, a DNS root node 304, and an E.164 Number (ENUM) database 306. In addition, each service provider network may include a DNS database 308*a,b* respectively.

In one embodiment, DICSDS 302 may be a common DNS system among service providers and E.164 providers. In one embodiment, DNS name resolution data may be controlled by the owning service provider via their local segment of the DICSDS 302. In one embodiment, DICSDS 302 may facilitate address lookup for interface nodes within service provider networks. For example, peer-to-peer interconnect control 202*a* on the first service provider network 102 may query DICSDS 302 to determine an address for P2P interconnect control 202*b* on the second service provider network 104 in order to initiate P2P route negotiations.

ENUM database 306 may contain a commonly accessible list of ENUM identifiers, which DICSDS 302 may access in response to a query from a P2P interconnect control 202. ENUM database 306 enables E.164 number to Service Provider mapping via DNS. DNS root node 304 enables the first service provider 102 and the second service provider 104 to create a common DNS system, such that both service providers have access to common address data.

FIG. 4 illustrates a hierarchical database schema for use as a routing data record in accordance with the present embodiments. In one embodiment, the hierarchy includes a plurality of data levels. For example, in the illustrated embodiment, the hierarchy illustrates four different levels corresponding to geographical regions. L1 is associated with continents, L2 is associated with countries in the continent, L3 is associated with regions in the country, and L4 is associated with cities in the region.

The routing data record may include information regarding the cost of using a particular route. Additionally, the data record may include an indication of a type and/or quality of services that are available on the route (e.g., best effort, suitable for video, suitable for voice, etc.). Additionally, the routing data record may include the peering point 210 associated with the route.

When a carrier performs a query of available routes, the query may return multiple available routes which may be grouped or organized according to the level associated with the specific target communication device. For example, the query may return a set of routes within a specified city, region, country, and/or continent as specified in the query parameters. Thus the database structure may provide relatively more focused or directed results that are more specifically useful for to the carrier making the query.

Figure 5:
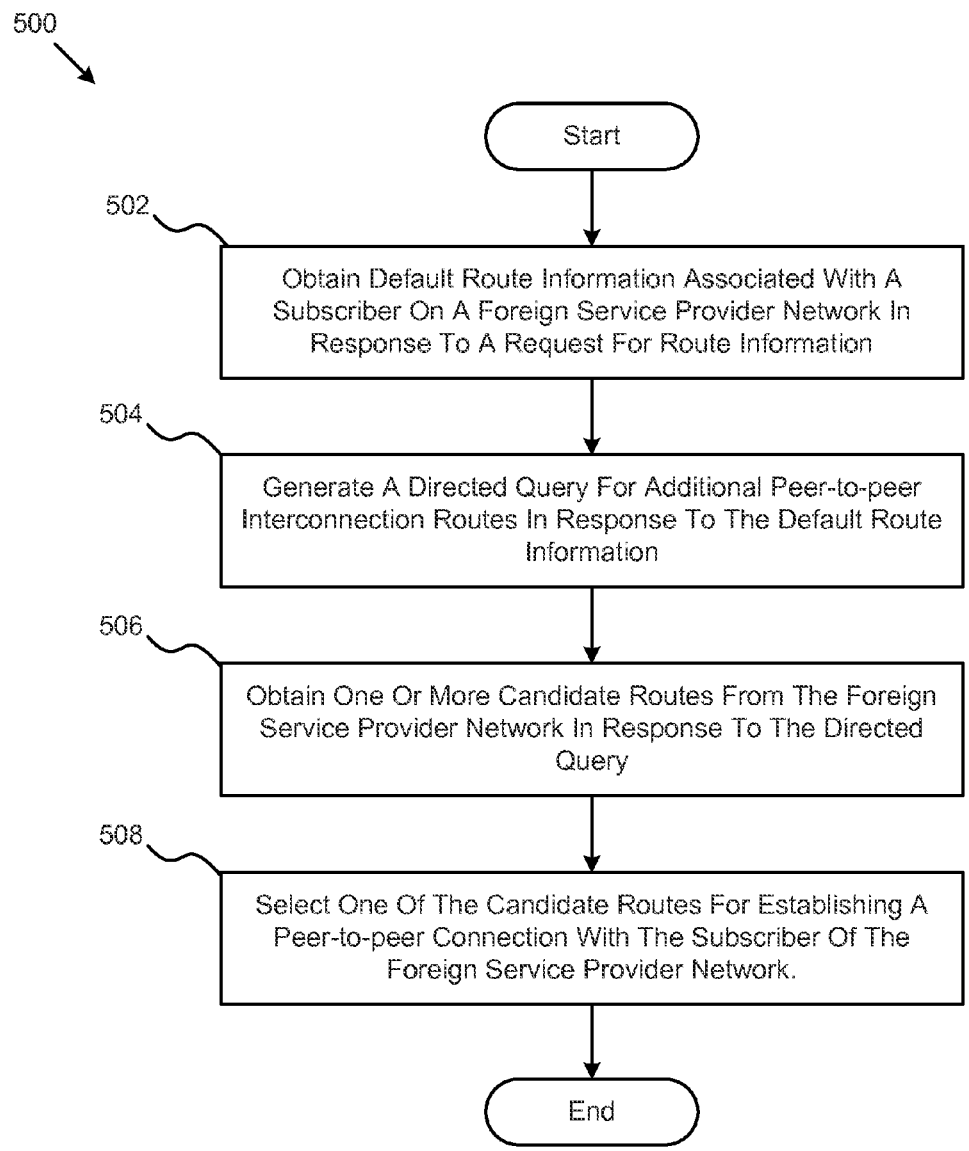
FIG. 5 is a flowchart of a method for determining peer-to-peer communication paths between service providers.

FIG. 5 is a flowchart of a method 500 for determining peer-to-peer communication paths between service providers. In one embodiment, P2P interconnect control 202*a* obtains default route information associated with a subscriber on a foreign service provider network in response to a request for route information, the default route information comprising identification of a peer access point designated for peer-to-peer interconnection as shown at block 502. In such an embodiment, the P2P interconnect control 202*b* may return the default route information in response to a request for access to the subscriber. In one embodiment, the subscriber is second communication device 108.

At block 504, the P2P interconnect Control may generate a directed query for additional peer-to-peer interconnection routes in response to the default route information. P2P interconnect control 202*a* may communicate the directed query to interconnect control 202*b* requesting additional routes for accessing one or more peering nodes 210*b* associated with second communication device 108.

At block 506, the P2P interconnect control 202*a* may obtain one or more candidate routes from the foreign service provider network in response to the directed query. In one embodiment, the candidate routes may include routes on the second service provider network 102 side. The directed query may, for example, be structured according to the hierarchical geographic database schema in response to information associated with the default route. For example, the default route may include geographical information indicating that the subscriber is on a specific continent, in a specific region of a country, and in a specific city in the region. Accordingly, the directed query may be structured according to the database schema and in response to a priori knowledge of the local side connection locations, cost information, service related information, etc., such that the query returns more useful results.

At block 508, the P2P interconnect control selecting one of the candidate routes for establishing a peer-to-peer connection with the subscriber of the foreign service provider network. The specific route may be selected in response to a list of accessible peer access points. Additionally, other factors associated with the route may be factors in the selection, including cost, quality of service, type of service, etc. In fact, the selection may be performed by an optimization process configured to weigh various selection factors and select an optimal route.

Figure 6:
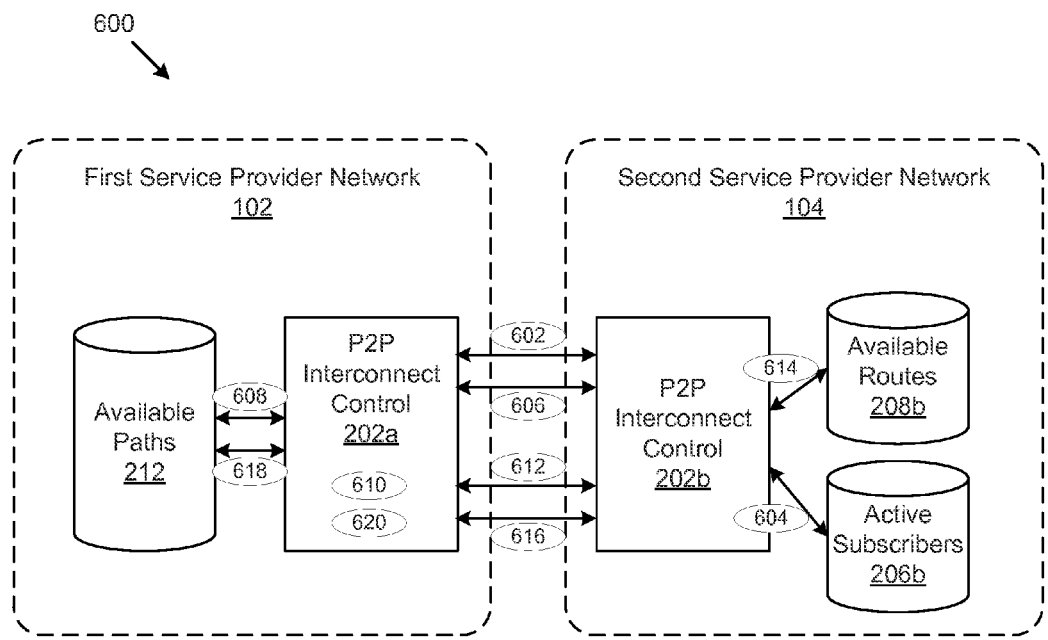
FIG. 6 is a message flow diagram for a method for determining peer-to-peer communication paths between service providers.

FIG. 6 illustrates an example of the method described above. The example is illustrates as a system state diagram, each state representing an action performed by a component of the system for performance of the method. At step 602, an initial request for a specific E.164 number may be received by P2P interconnect control 202*a*. P2P interconnect control 202*a* may send a message to P2P interconnect control 202*b* requesting a connection to a subscriber associated with the E.164 number. In one embodiment, the P2P interconnect control 202*b* may query the active subscriber database 206*b* as shown at state 604. In response to the query, the P2P interconnect control 202*b* may send an algorithm support validation, roaming information, and the default route for the E.164 number to P2P interconnect control 202*a* as shown at state 606.

In response, P2P interconnect control 202*a* may query available paths database 212 for a list of available connection points as shown at state 608. P2P interconnect control 202*a* may then generate a directed query in response to the results of the query of available paths and the geographical information from the default route as shown at state 610. P2P interconnect control 202*a* may then communicate the directed query to P2P interconnect control 202*b* as shown at state 612.

In response to the directed query, P2P interconnect control 202*b* may query available routes database 208*b* to identify one or more routes available for establishing a peer-to-peer connection with a peering node 210*b* associated with the subscriber as reflected at state 614. The response to query 614 may include a listing of available routes. In one embodiment, the listing of available routes may be arranged in accordance with the hierarchical database schema described in FIG. 4. P2P interconnect control 202*b* may communicate the results of the directed query back to P2P interconnect control 202*a* as shown at state 616. P2P interconnect control 202*a* may query available paths database 212 in response to the results of the directed query as shown in state 618. Finally, P2P interconnect control 202*a* may identify one or more available paths of query 618 that join the one or more available routes from the results of the directed query 616 as shown at state 620, and may then use the identified complete path for connecting to the specified peering node 210*b*.

As noted above, embodiments of methods and systems for determining peer-to-peer communication paths between service providers may be implemented or executed, at least in part, by one or more computer systems. One such system is illustrated in FIG. 7. In various embodiments, system 700 may be a server, a workstation, a desktop computer, a laptop, a tablet computer, a mobile device, a smart phone, or the like. In one embodiment, the system 700 is a virtual one, implemented in a public or private cloud system. In some cases, system 700 may be used to implement communication devices 101 and/or 102, and application server(s) 105 shown in FIG. 1. As illustrated, computer system 700 includes one or more processor(s) 710A-N coupled to a system memory 720 via an input/output (I/O) interface 730. Computer system 700 further includes a network interface 740 coupled to I/O interface 730, and one or more input/output devices 750, such as proximity device(s) 103 (e.g., a Bluetooth® adaptor, a Wi-Fi adaptor, or the like), keyboard 770, and display(s) 780.

In various embodiments, computer system 700 may be a single-processor system including one processor 710A (e.g., processor 201 shown in FIG. 2), or a multi-processor system including two or more processors 710A-N (e.g., two, four, eight, or another suitable number). Processor(s) 710A-N may include any processor capable of executing program instructions. For example, in various embodiments, processor(s) 710A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processor(s) 710A-N may commonly, but not necessarily, implement the same ISA. Also, in some embodiments, at least one processor 710A may be a graphics processing unit (GPU) or other dedicated graphics-rendering device.

System memory 720 may be configured to store program instructions (e.g., algorithms for querying databases, accessing foreign service provider networks, etc.) and/or data accessible by processor(s) 710A-N. In various embodiments, system memory 720 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in connection with FIGS. 4-8, may be stored within system memory 720 as program instructions 725 and data storage 735, respectively. Additionally or alternatively, methods described herein may be implemented as a software program that is stored within system memory 720 and is executable by processor(s) 710A-N. In other embodiments, program instructions and/or data may be received, sent or stored upon different types of computer-accessible media or on similar media separate from system memory 720 or computer system 700. Generally speaking, a computer-accessible medium may include any tangible or non-transitory storage media or memory media such as electronic, magnetic, or optical media—e.g., disk or CD/DVD-ROM coupled to computer system 700 via I/O interface 730. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which In an embodiment, I/O interface 730 may be configured to coordinate I/O traffic between processor(s) 710A-N, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor(s) 710A-N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor(s) 710A-N.

Network interface 740 may be configured to allow data to be exchanged between computer system 700 and other devices attached to a network (e.g., telecommunications network 104 of FIG. 1), such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as FibreChannel SANs, or via any other suitable type of network and/or protocol.

Input/output devices 750 may, in some embodiments, include one or more display terminals, keyboards, keypads, touchpads, scanning devices, RFID readers, NFC readers, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement certain embodiments described herein, and data storage 735, comprising various data may be accessible by program instructions 725. In an embodiment, program instructions 725 may include software elements of embodiments illustrated in the above figures. For example, program instructions 725 may be implemented in various embodiments using any desired programming language, scripting language, or combination of programming languages and/or scripting languages (e.g., C, C++, C#, Java™, JavaScript™, Perl, etc.). Data storage 735 may include data that may be used in these embodiments (e.g., recorded communications, profiles for different modes of operations, etc.). In other embodiments, other or different software elements and data may be included.

A person of ordinary skill in the art will appreciate that computer system 700 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system or processor-based configurations.

Although certain embodiments are described herein with reference to specific examples, numerous modifications and changes may be made in light of the foregoing description. Accordingly, the specification and figures are to be regarded in an illustrative rather than a restrictive sense, and all such modifications are intended to be included within their scope. Any benefits, advantages, or solutions to problems that are described herein with regard to specific embodiments are not to be construed as a critical, required, or essential feature or element of any or all the claims. Furthermore, it should be understood that the various operations described herein may be implemented in software, hardware, or a combination thereof. The order in which each operation of a given technique is performed may be changed, and the elements of the systems illustrated herein may be added, reordered, combined, omitted, modified, etc. It is intended that the embodiments described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as "connected" and/or "in communication with," although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
obtaining, by a peer-to-peer interconnect controller, default route information associated with a subscriber on a foreign service provider network in response to a request for route information, the default route information comprising identification of a peer access point designated for peer-to-peer interconnection;
generating, by the peer-to-peer interconnect controller, a directed query for additional peer-to-peer interconnection routes in response to the default route information, wherein the directed query is arranged in response to a predetermined database schema, wherein the predetermined database schema is a hierarchy of geographically related routes per subscriber, and wherein the hierarchy of geographically related routes includes an organization of routes according to a plurality of levels defined by continents, countries within the continents, regions within the countries, and cities within the regions;
obtaining, by the peer-to-peer interconnect controller, one or more candidate routes from the foreign service provider network in response to the directed query; and
selecting, by the peer-to-peer interconnect controller, one of the candidate routes for establishing a peer-to-peer connection with the subscriber of the foreign service provider network.

2. The method of claim 1, wherein the default route information associated with the geographical location of the peer access point.

3. The method of claim 1, wherein selecting one of the candidate routes further comprises joining the results of the directed query with a list of accessible peer access points to identify one or more complete paths to the subscriber on the foreign service provider network.

4. The method of claim 3, further comprising selecting among the one or more complete paths in response to cost information associated with the one or more complete paths.

5. The method of claim 4, wherein the cost information is adjustable by the foreign service provider in real-time.

6. The method of claim 3, further comprising selecting among the one or more complete paths in response to quality of service information associated with the one or more complete paths.

7. The method of claim 3, further comprising selecting among the one or more complete paths in response to type of service information associated with the one or more complete paths.

8. A system, comprising:
a peer-to-peer interconnect controller; and
a memory having program instructions stored thereon that, upon execution by the peer-to-peer interconnect controller, cause the system to:
obtain default route information associated with a subscriber on a foreign service provider network in response to a request for route information, the default route information comprising identification of a peer access point designated for peer-to-peer interconnection;
generate a directed query for additional peer-to-peer interconnection routes in response to the default route information;
obtain one or more candidate routes from the foreign service provider network in response to the directed query;
select one of the candidate routes for establishing a peer-to-peer connection with the subscriber of the foreign service provider network, wherein selecting one of the candidate routes further comprises joining the results of the directed query with a list of accessible peer access points to identify one or more complete paths to the subscriber on the foreign service provider network, wherein the list of accessible peer access points is generated in response to a query of a database maintained by the first service provider network, wherein records of the database describe a plurality of available paths to interface foreign service provider networks, and wherein the available routes terminate at one or more peer access points on the foreign service provider network; and
select among the one or more complete paths in response to cost information associated with the one or more complete paths.

9. The system of claim 8, wherein the default route information associated with the geographical location of the peer access point.

10. The system of claim 8, wherein the directed query is arranged in response to a predetermined database schema.

11. The system of claim 10, wherein the predetermined database schema is a hierarchy of geographically related routes per subscriber.

12. The system of claim 8, wherein the cost information is adjustable by the foreign service provider in real-time.

13. The system of claim 8, wherein the peer-to-peer interconnect controller is further configured to select among the one or more complete paths in response to quality of service information associated with the one or more complete paths.

14. The system of claim 8, wherein the peer-to-peer interconnect controller is further configured to select among the one or more complete paths in response to type of service information associated with the one or more complete paths.

15. A tangible computer-readable storage medium having program instructions stored thereon that, upon execution by a computer system, cause the computer system to:

obtain default route information associated with a subscriber on a foreign service provider network in response to a request for route information, the default route information comprising identification of a peer access point designated for peer-to-peer interconnection;

generate a directed query for additional peer-to-peer interconnection routes in response to the default route information, wherein the directed query is arranged in response to a predetermined database schema, wherein the predetermined database schema is a hierarchy of geographically related routes per subscriber, and wherein the hierarchy of geographically related routes includes an organization of routes according to a plurality of levels defined by continents, countries within the continents, regions within the countries, and cities within the regions;

obtain one or more candidate routes from the foreign service provider network in response to the directed query;

select one of the candidate routes for establishing a peer-to-peer connection with the subscriber of the foreign service provider network, wherein selecting one of the candidate routes further comprises joining the results of the directed query with a list of accessible peer access points to identify one or more complete paths to the subscriber on the foreign service provider network, wherein the list of accessible peer access points is generated in response to a query of a database maintained by the first service provider network, wherein records of the database describe a plurality of available paths to interface foreign service provider networks, and wherein the available routes terminate at one or more peer access points on the foreign service provider network; and select among the one or more complete paths in response to cost information associated with the one or more complete paths.

* * * * *